United States Patent [19]

Potepan et al.

[11] Patent Number: 4,859,526
[45] Date of Patent: Aug. 22, 1989

[54] HIGH TEMPERATURE COMPRESSED NON-ASBESTOS SHEET

[75] Inventors: Agnes Potepan, Canandaigua; Richard L. Dibble, Williamson, both of N.Y.

[73] Assignee: Garlock Inc., Palmyra, N.Y.

[21] Appl. No.: 151,873

[22] Filed: Feb. 3, 1988

[51] Int. Cl.$^4$ .................. B32B 9/04; B65D 53/00; F16J 15/6; F16J 15/10

[52] U.S. Cl. .................. 428/283; 277/227; 277/228; 428/286; 428/339; 428/408; 428/920

[58] Field of Search ............. 428/283, 286, 339, 408, 428/920

[56] References Cited

U.S. PATENT DOCUMENTS

| | | |
|---|---|---|
| 4,271,228 | 6/1981 | Foster et al. . |
| 4,508,777 | 4/1985 | Yamamoto . |
| 4,529,662 | 7/1985 | Lancaster et al. . |
| 4,529,663 | 7/1985 | Lancaster et al. . |
| 4,546,033 | 10/1985 | Tsuchimoto et al. . |
| 4,656,085 | 4/1987 | Bechen et al. . |
| 4,770,926 | 9/1988 | Yamamura et al. ........... 428/245 |

*Primary Examiner*—James C. Cannon
*Attorney, Agent, or Firm*—Sixbey, Friedman, Leedom & Ferguson

[57] ABSTRACT

A high temperature compressed non-asbestos sheet is provided which is effective for gasketing applications in temperatures up to at least 900° F. The sheet is formed from carbon fibers having a high percentage of carbonization and a low modulus of elasticity. The carbon content of the fibers is above 90% while the modulus of elasticity is less than 10,000,000 psi., and such fibers form at least 75% of the fiber content of the sheet. The carbon fibers may be blended with small portions of organic fibers to enhance the physical properties of the sheet.

21 Claims, No Drawings

HIGH TEMPERATURE COMPRESSED NON-ASBESTOS SHEET

TECHNICAL FIELD

The present invention relates to a non-asbestos compressed sheet particularly adapted for use as a gasket material, and more particularly to an improved compressed non-asbestos sheet which is adapted to operate effectively in high temperature environments.

BACKGROUND ART

For many years, compressed asbestos sheet material has been used for gasketing and a wide range of other industrial uses. Compressed asbestos sheets have traditionally been prepared by mixing a base of asbestos fibers with a rubber binder and subjecting the resultant mixture to pressure and elevated temperature. Typically, known asbestos sheets can be made on a two roll sheeter machine (such as a Troester machine) which has a pair of rollers located vertically one above the other. The lower roller is a larger, hot roller while the upper roller is a smaller, normally unheated roller. To form the conventional asbestos sheet on a machine of this type, a quantity of starter compound is first built up on the hot roller and then a quantity of body compound is added in the nip between the two rotating rollers. A compressed sheet material will be formed on the hot roller to the desired thickness and may then be removed and placed on top of a table or other support.

In recent years, the issue of possible health problems caused by the adverse influence of asbestos on the human body has led to the development of non-asbestos gasketing sheet materials. For example, U.S. Pat. No. 4,271,228 to Foster et al. discloses a flexible sheet material particularly suitable for use in gaskets which includes organic fiber, organic binder, and a blend of finely divided vermiculite with another asbestos-free inorganic finely divided particulate filler. This use of organic fibers in place of asbestos for the formation of gasket material is also illustrated by the gasket material compositions disclosed in the Lancaster et al. U.S. Pat. Nos. 4,529,662 and 4,529,663. Here, a combination of organic cellulose fibers are mixed with organic amide fibers to form the fiber base for the gasket material.

Some non-asbestos gasketing materials have been developed which incorporate a combination of organic and inorganic fibers as the base material for the gasket, and U.S. Pat. Nos. 4,508,777 to Yamamoto et al. and 4,656,085 to Bechen et al. are illustrative of this art. It should be noted that Yamamoto et al. discloses both the combination of two types of organic fibers or a combination of an organic with an inorganic fiber, and in some cases the inorganic fiber employed is a carbon fiber. This use of carbon fibers is also disclosed in the gasket sheet of the Tsuchimoto et al. U.S. Pat. No. 4,546,033. Here, the gasket sheet is formed from 50% to 85% by weight of a fibrous material, which may be carbon fiber or a mixture of organic and inorganic fibers, and by a rubber material binder.

Current non-asbestos gasketing products manufactured on a two roll sheeter or calendar have been found to operate satisfactorily at temperatures up to approximately 700 degrees F. However, at temperature ranges from 700 degrees F to 1000 degrees F., gasketing materials formed from organic fibers have proven to be unsatisfactory. Carbon fibers will satisfactorily withstand high temperatures when employed as a base for a gasketing material, but it has been generally found that, for the most part, carbon fibers are either too brittle or of too low a carbon content to provide effective heat resistance. For example, the carbon fibers disclosed in the aforementioned Yamamoto et al patent have a carbonization level of about 80%. With most carbon fibers, the higher the percentage of carbonization, the higher the modulus of elasticity, and this modulus, for many carbon fibers, is in the range of 25,000,000 to 30,000,000 psi. The use of fibers of this type results in gasketing products which are too brittle, have poor tear resistance, and in general exhibit poor physical properties.

The non-asbestos compressed sheet materials which have been previously developed for gasket applications have generally included large percentages by weight of organic, inorganic or mixed fibers, and, as indicated by the aforementioned Yamamoto et al patent, with such previous formulations, fiber amounts of less than 25% by weight result in sheets with decreased tensile strength. Also, such previous formulations often employ large percentages of organic fibers, such as aramid, which inhibit the ability of the sheet to operate effectively as a gasket material in high temperature environments, particularly for chemical applications. Consequently, a need exists for a high temperature, non-asbestos sheet material having a fiber base formed primarily of carbon fibers which impart effective temperature rresistance to the sheet while providing a sheet with excellent sealing effectiveness and tensile strength. Ideally, a small portion of organic fiber is incorporated in the fiber base to enhance the tensile strength of the sheet, but the proportion of organic to carbon fiber must be such that the heat resistance and sealing capabilities of the material are not degraded, even in chemical environments.

DISCLOSURE OF THE INVENTION

It is a primary object of the present invention to provide a novel and improved compressed, non-asbestos sheet material which may be effectively employed as a superior gasketing product having exceptionally low creep relaxation at elevated temperatures.

Another object of the present invention is to provide a novel and improved compressed, non-asbestos sheet material which includes a fiber base formed with carbon fibers wherein the carbon content of the fibers is greater than 90% while the modulus of elasticity for the carbon fibers is low.

Yet another object of the present invention is to provide a novel and improved high temperature compressed, non-asbestos sheet having a fiber base formed primarily from carbon fibers having a low modulus of elasticity and a high carbon content. A relatively small percentage of the fiber base is formed by organic fibers which enhance the tear resistance and other physical properties of the base without substantially detracting from the heat resistance capabilities of the finished sheet.

A still further object of the present invention is to provide a novel and improved high temperature compressed, non-asbestos sheet formed with a fiber base consisting primarily of carbon fibers having a carbon content which is greater than 90% and a modulus of elasticity which is less than 10,000,000 psi. The carbon fibers are mixed with a relatively small portion of aramid fibers which enhance the tear resistance and tensile strength of the finished sheet without substantially decreasing the temperature resistance capabilities thereof. The fiber base is combined with an elastomeric binder material and a filler, which may be clay in a fine powder form. The remainder of the sheet material formulation includes curatives, antioxidants, and other chemicals or solvents for the binder.

Another object of the present invention is to provide a novel and improved high temperature compressed, non-asbestos sheet formed from a base consisting of at least 10% to 30% by weight of fibers. Although additional fiber can be used, this range is the most desirable. At least 75% of the fibers forming the base consist of carbon fibers having a carbon content which is greater than 90% and a low modulus of elasticity. The fiber base is mixed with an elastomeric binder which is 5% to 30% by weight of the sheet and a filler material which is 25% to 80% by weight of the sheet. These are mixed with other ingredients which form on the order of 5% by weight of the sheet.

BEST MODE FOR CARRYING OUT THE INVENTION

The high temperature compressed non-asbestos sheet material of the present invention includes a fiber base formed primarily or entirely from carbon fibers having carefully selected characteristics. To impart an ability to operate effectively in high temperature environments, these carbon fibers must incorporate a carbon content which is greater than 90%, and ideally, these fibers will have a degree of carbonization within the range of 95% to 97%. In addition to a high degree of carbonization, the carbon fibers used for the non-asbestos sheet, must have a low modulus of elasticity to enhance the processability of the uncured mixture and the tear resistance and tensile strength of the finished sheet. Consequently, the carbon fibers must have a modulus of elasticity less than 10,000,000 psi, and preferably a modulus within the range of 5,000,000–7,000,000 psi. These characteristics may be obtained with commercially available petroleum based carbon fibers such as those having a petroleum pitch base.

Although the carbon fibers may constitute all, or practically all of the fiber base, it is preferable to form the fiber base with a small proportion of organic fibers such as aramid fibers commercially available under the trademark Kevlar. Aramid is a generic name for fibers formed from the condensation product of isophthalic or terephthalic acid and m- or p-phenylenediamine.

In the blend of fibers forming the fiber base, the volume of organic fibers must be low to maintain the temperature resistance characteristics for the compressed sheet, but even a low volume of organic fiber imparts greater strength and enhances the physical properties of the sheet. The organic fiber contained in the fiber base should be less than 25% of the total fiber present in the base, and the fiber base should constitute no more than 30% by weight of the total non-asbestos compressed sheet. Ideally, the fiber base will constitute less than 25% by weight of the compressed sheet and is more preferably within the range of 20 to 24.5%.

The remainder of the non-asbestos compressed sheet consists primarily of fillers and a binder, the binder being an elastomeric material forming 10–25% by weight of the finished sheet. Many of the elastomeric rubber materials well known to those skilled in the art can be used as the binder for the non-asbestos compressed sheet of this invention. Thus, by way of illustration and not limitation, one can use natural rubber; isoprene rubber; styrene-butadiene rubber; chloroprene rubber; butadiene-acrylonitrile copolymer rubber; butyl rubber, ethylene-propylene copolymer; a synthetic elastomer comprised of a terpolymer of ethylene, propylene, and a diene side chain; chloro-sulfonated polyethylene elastomer; acrylate butadiene rubber; organic polysulfide elastomer; elastomers formed from copolymers of vinylidene fluoride and hexafluoropropylene; elastomers formed from copolymers of chlorotrifluoroethylene and vinylidene fluoride; polybutadiene rubbers; butadiene-acrylonitrile rubbers modified with carboxylic groups; elastomers comprised of hompolymers or epichlorohydrin; elastomers comprised of copolymers of epichlorohydrin with ethylene oxide; blends of polyvinyl chloride rubbers with butadiene-acrylonitrile rubbers; mixtures thereof; and the like. Some of these elastomers are described on pages 1–108 through 1–121 of the "Handbook of Plastics and Elastomers", edited by Charles A. Harper (McGraw-Hill, New York, 1975). The aforementioned pages of said Handbook are hereby incorporated by reference herein.

The remainder of the non-asbestos compressed sheet is formed by fillers which can constitute 35% to 80% by weight of the sheet, although it is preferable that the filler be within the range of from 45% to 65% by weight. The filler is also preferably inorganic, and by way of illustration, may consist of clay, calcium meta silicate, barium sulfate, alumina, alumina trihydrate, aluminum powder, calcium carbonate, calcium silicate, carbon, glass, kaolin, calcined kaolin, mica, molybdenum disulfide, amorphous silica, talc, feldspar, fly ash, sand, quartz, diatomaceous earth, tripoli, vermiculite, and the like, used alone or in various mixtures thereof. The most preferred inorganic filler for the gasket body composition of this invention is hard clay such as hydrated aluminum silicate (sold under the trademark Suprex) having a specific gravity of 2.60. It is non-toxic, odorless, cream colored, has a G.E. Brightness of 74–76%, is a fine, airfloated powder 92–97% finer than 2 microns. Other fillers can be used such as barytes ($BaSO_4$) and calcium metasilicate (Wollastonite) ($CaSiO_3$). These can be mixed with Suprex or other base fillers or used alone.

In addition to the fiber base, the binder and the filler which constitute the primary ingredients of the non-asbestos compressed sheet of this invention, certain activators, vulcanizers and accelerators are also included in the sheet formulation. Antioxidants and colorants may also be included. By way of illustration and not limitation, activators such as, e.g. zinc oxide, litharge (lead oxide), lead carbonate, magnesium oxide, steric acid, urea, triethanolamine, and those listed at pages 48 to 65 of Rubber World, Blue Book 1979, published by Bill Publicatons, hereby incorporated by reference herein, may be used in this composition. It is preferred that the gasket body composition contain from about 0.1 to about 2.0 percent of activator. The most preferred activator is zinc oxide. Suitable vulcanizers include, for example, sulfur, peroxides, magnesium oxide, and some sulfur bearing compounds.

The sheet composition of this invention can also contain about 0.1 to about 2.0 percent of an accelerator. Any suitable accelerator known to those in the art can be used. Thus, for example, one can use such accelerators as 2-mercaptobenzothiazole, benzothiazyl disulfide, tetraethyl thiuramdisulfide, and others listed, for example, on pages 18–46 in the above mentioned Blue Book.

The gasket body composition of this invention can also contain from about 0.1 to about 1.0 percent of antioxidant. Any of the antioxidants, antiozonants, and inhibitors (protective ingredients) such as those known to those skilled in the art may be used in said composition. Thus, e.g. one may use the antioxidant commercially identified as Flectol H Powder (Poly 1,2-dihydro-2,2,4 trimetholquinoline), or any of the antioxidants described on pages 652–655 of the October 1978, Column 55, Number 10A Edition of the "Modern Plastics Encyclopedia" (McGraw-Hill, New York 1978); and on pages 95–116 of the above mentioned Blue Book; these pages are hereby incorporated by reference herein.

In forming the non-asbestos compressed sheet of the present invention, the previously described ingredients may be employed in the formation of a body layer which provides the primary component of the sheet, but the sheet may also include a starter layer and, in some instances, a finish layer on opposite sides of the body. The starter layer is used to help initiate the formation of the sheet on the sheeter or sheet forming machine, while the finish layer, if used, provides a smoother and more aesthetic finish on the sheet. Normally, the starter and finish layers, in combination, do not exceed 5% by weight of the non-asbestos compressed sheet, and ideally constitute less than 10% by weight of the sheet.

The starter and finish layers for the non-asbestos compressed sheet of the present invention may contain carbon fibers, but generally, these layers will be formed primarily of filler materials similar to those used in the main body of the sheet. For example, the starter layer composition may contain from about 20% to about 48% of clay and from about 22% to about 48% of a silicate, such as calcium meta silicate.

EXAMPLE 1

The material for the starter layer was formed by adding 48 pounds of one of the aforementioned elastomeric binders and 45 gallons of solvent (toluol) with 12.5 pounds of base which contains activator, vulacanizers, accelerators, antioxidants and colorants in a mixer and mixing these components for 120 minutes. Subsequently, 80 pounds of Wollastonite was added to the mixture and mixed for 15 minutes, and then 120 pounds of Suprex clay was added and the mixer was run for another 120 minutes.

A composition similar to that described in Example 1, may be used for the finish coat which may consist of from about 5% to 15% by weight of a rubber or elastomeric binder material and from about 40% to 95% by weight of filler. Thus, the finish composition could, effectively be formed from the mixed composition previously described with respect to the starter layer.

The body layer for the high temperature compressed non-asbestos sheet may be formed as illustrated by the following specific examples which illustrate the invention but are not to be deemed to be limitive thereof. In all examples, the carbon fibers have a carbon content of above 90% and a modulus of elasticity of less than 10,000,000 psi.

EXAMPLE 2

34 gallons of solvent (toluol) are placed in a mixer and a base material is added. The base material is a mixture of 2.9 pounds of zinc oxide, 1.8 pounds of sulfur, 1.2 pounds of a polymerized 1,2-dihydro-2,2,4-trimethyl-quinoline (such as AgeRite Resin D available from R. T. Vanderbilt Company of Norwalk, Conn.), 0.8 pounds of tetramethyl-thiuramdisulfide, 11 pounds of carbon black and 15 pounds of Suprex clay. The zinc oxide operates as an activator, the sulfur as a vulcanizer, the polymerized 1,2-dihydro-2,2,4 trimethylquinoline as an antioxidant, and the tetramethylthuiramdisulfide as an accelerator. The carbon black operates as both a filler and a colorant. This mixture is mixed for about 10 minutes, and the mixer is stopped and 44 pounds of SBR-1012 (styrene-butadiene copolymer), 13 pounds of natural rubber and 20 pounds of Kevlar pulp (available from the Dupont Company of Wilmington, Del.) are added. This mixture is then mixed for approximately 15 minutes before the mixer is stopped for the addition of filler. Now 150 pounds of Suprex clay, 50 pounds of barytes and 50 pounds of Mica powder are added. After mixing this composition for about 15 minutes, the mixer is again stopped and 90 pounds of $\frac{1}{4}$ inch carbon fiber is added. The mixer is run for approximately 35–40 minutes, and then stopped for the addition of a water and soda ash solution. This solution contains about 1.5 gallons of water and 2 pounds of soda ash. The mixer is started for about 1 minute, and then the material is removed from the mixer. The total mixing time is approximately 81 minutes.

The high temperature compressed non-asbestos sheet of the present invention can be formed using the starter and finish layer material of Example 1 and the body layer material of Example 2. A quantity of the material of Example 1 is added to the hot roll of a sheeter (such as a Troester sheeter manufactured by the Troester Company of West Germany), as a starter composition in an amount sufficient to cover the roll. This is done with the rolls rotating and the hot roll heated, and once the roll is coated, the pressure is adjusted and the body layer material of Example 2 is fed to the nip between the rolls. Once the thickness of the body layer builds to the desired point, material produced in accordance with Example 1 may be coated onto the sheet to provide a finish layer, and the sheet is subsequently removed from the sheeter. The method for the formation of such sheets on conventional sheeters is well-known, and the sheet may be formed with only the body layer, or only the body and starter layers. Sheet thickness is variable and a number of sheet thicknesses can be produced, but in all cases the starter and finish layers combined will form no more than 0.004 inches of the total sheet thickness.

The following examples show other body layer formulations which have been used to form compressed, non-asbestos sheets in accordance with the invention. Each of these formulations includes the base material of Example 2 defined as "curatives." The percentages indicated are percentages by weight of the base layer.

EXAMPLE 3

4% aramid fiber (i.e., Kevlar)
20% carbon fiber
11.8% binder (i.e., natural rubber and styrene butadiene copolymer)
60% filler
4.2% curatives

EXAMPLE 4

4.1% aramid fiber (i.e., Kevlar)
20.5% carbon fiber 11.7% binder (i.e., natural rubber and styrene butadine copolymer)
60% fillers
3.7% curatives

EXAMPLE 5

7% aramid fiber (i.e., Kevlar)
52.2% carbon fiber
18% binder (i.e., natural rubber and styrene butadine copolymer)
17.4% fillers
5.3% curatives The materials specified in Examples 3, 4 and 5 may be mixed in the manner described in Example 2 to provide the raw material for use in the formation of the body layer.

We claim:

1. A high temperature compressed non-asbestos sheet comprising a body which includes an elastomeric binder forming 10%–25% by weight of said body, a fiber base formed primarily of carbon fibers, said carbon fibers having a carbon content in excess of 90% and a modulus of elasticity less than 10,000,000 PSI and constituting at least 75% of said fiber base, and a filler forming 35%–80% by weight of said body.

2. The high temperature compressed non-asbestos sheet of claim 1, wherein a starter layer is formed on one side of said body.

3. The high temperature compressed non-asbestos sheet of claim 2, wherein a finish layer is formed on a side of said body opposite to said starter layer, said starter and finish layers forming no more than 0.004" of the total thickness.

4. The high temperature compressed non-asbestos sheet of claim 1, wherein said fiber base includes organic fibers mixed with said carbon fibers, said organic fibers forming less than 25% of the fibers in said fiber base.

5. The high temperature compressed non-asbestos sheet of claim 4 wherein said fiber base is no more than 30% by weight of said body.

6. The high temperature compressed non-asbestos sheet of claim 5, wherein said fiber base is within the range of 20%–24.5% by weight of said body.

7. The high temperature compressed non-asbestos sheet of claim 6, wherein said filler is formed of inorganic material in an amount within the range of 45%–65% by weight of said body.

8. The high temperature compressed non-asbestos sheet of claim 7, wherein a starter layer is formed on one side of said body, said starter layer including a mixture of an elastomeric binder and an inorganic filler material.

9. The high temperature compressed non-asbestos sheet of claim 8, wherein a finish layer is formed on a side of said body opposite to said starter layer, said finish layer including a mixture of an elastomeric binder and an inorganic filler material, said starter and finish layers forming no more than 0.004 inches of the thickness of said compressed sheet.

10. A high temperature compressed non-asbestos sheet comprising an elastomeric binder, a fiber base including carbon fibers, said carbon fibers having a carbon content in excess of 90% and a modulus of elasticity which is less than 10,000,000 psi., and a filler.

11. The high temperature, compressed non-asbestos sheet of claim 10, wherein the carbon content of said carbon fibers is within the range of 95%–97% and the modulus of elasticity of said carbon fibers is within the range of 5,000,000 to 7,000,000 psi.

12. The high temperature compressed non-asbestos sheet of claim 10, wherein said fiber base includes organic fibers mixed with said carbon fibers, said organic fibers forming less than 25% of the fibers in said fiber base.

13. The high temperature compressed non-asbestos sheet of claim 12, wherein said fiber base forms less than 25% by weight of said compressed non-asbestos sheet.

14. The high temperature compressed non-asbestos sheet of claim 12, wherein said elastomeric binder forms 10%–25% by weight of said compressed non-asbestos sheet and said filler is an inorganic material in an amount within the range of 35%–80% by weight of said compressed non-asbestos sheet.

15. The high temperature compressed non-asbestos sheet of claim 14, wherein said filler is within the range of 45%–65% by weight of said compressed, non-asbestos sheet, the carbon content of said carbon fibers being within the range of 95%–97% and the modulus of elasticity of said carbon fibers being within the range of 5,000,000 to 7,000,000 psi.

16. The high temperature compressed non-asbestos sheet of claim 15, wherein said fiber base forms less than 25% by weight of said compressed non-asbestos sheet.

17. The high temperature compressed non-asbestos sheet of claim 10, wherein said carbon fibers form at least 20% by weight of said compressed non-asbestos sheet.

18. The high temperature compressed non-asbestos sheet of claim 17, wherein said organic fibers are aramid fibers, said fiber base forming no more than 30% by weight of said compressed non-asbestos sheet.

19. The high temperature compressed non-asbestos sheet of claim 10 wherein said fiber base includes organic fibers mixed with a larger amount of said carbon fibers, said organic fibers forming less than 25% of the fibers in said fiber base, said fiber base forming within the range of 20%–24.5% by weight of said compressed non-asbestos sheet.

20. The high temperature compressed non-asbestos gasket of claim 19, which includes a body layer, a starter layer formed on one side of said body layer, and a finish layer formed on a side of said body layer opposite to said starter layer, said starter and finish layers combined forming no more than 0.004 inches of the thickness of said compressed non-asbestos sheet.

21. The high temperature compressed non-asbestos sheet of claim 20, wherein said starter and finish layers include a mixture of an elastomeric binder and an inorganic filler material.

* * * * *